United States Patent
Takagi

(10) Patent No.: US 9,649,885 B2
(45) Date of Patent: May 16, 2017

(54) PNEUMATIC TIRE

(71) Applicant: SUMITOMO RUBBER INDUSTRIES, LTD., Kobe-shi, Hyogo (JP)

(72) Inventor: Keiji Takagi, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 327 days.

(21) Appl. No.: 14/188,194

(22) Filed: Feb. 24, 2014

(65) Prior Publication Data

US 2014/0311638 A1 Oct. 23, 2014

(30) Foreign Application Priority Data

Apr. 23, 2013 (JP) .................................. 2013-090643

(51) Int. Cl.
*B60C 11/03* (2006.01)

(52) U.S. Cl.
CPC ...... *B60C 11/0302* (2013.04); *B60C 11/0304* (2013.04); *B60C 11/0318* (2013.04);
(Continued)

(58) Field of Classification Search
CPC ............. B60C 11/0304; B60C 11/0302; B60C 2011/0374
See application file for complete search history.

(56) References Cited

U.S. PATENT DOCUMENTS 3,584,670 A * 6/1971 Verdier ............... B60C 11/0311
152/209.19

6,439,286 B1 * 8/2002 Baumhofer ........... B60C 19/001
152/209.8
(Continued)

FOREIGN PATENT DOCUMENTS

DE  10311430 A1 * 9/2004
EP  2752309 A2    7/2014
(Continued)

OTHER PUBLICATIONS

Machine translation for Japan 2004-155416 (no date).*
(Continued)

*Primary Examiner* — Steven D Maki
(74) *Attorney, Agent, or Firm* — Birch, Stewart, Kolasch & Birch, LLP

(57) ABSTRACT

A pneumatic tire includes a tread portion with an unsymmetrical tread pattern that includes a circumferentially extending first main groove at a nearest side of an inboard tread edge, a circumferentially extending second main groove adjacent to the first main groove, and a middle land portion arranged therebetween. The middle land portion is provided with a plurality of inclined grooves, a plurality of inboard middle lateral grooves including one end communicated with the first main groove and the other end communicated with the inclined groove, and a plurality of outboard middle lateral grooves including one end communicated with the second main groove and the other end communicated with the inclined groove. Respective groove center points of the inboard middle lateral grooves are arranged in different places in the circumferential direction of the tire from respective groove center points of the outboard middle lateral grooves.

9 Claims, 2 Drawing Sheets

(52) U.S. Cl.
CPC .............. *B60C 2011/0346* (2013.04); *B60C 2011/0358* (2013.04); *B60C 2011/0374* (2013.04); *B60C 2011/0381* (2013.04)

(56) References Cited

U.S. PATENT DOCUMENTS

| | | | |
|---|---|---|---|
| D700,880 S * | 3/2014 | Takemoto | .................... D12/531 |
| 2006/0151078 A1* | 7/2006 | Colombo | ............ B60C 11/0302 152/209.8 |
| 2008/0135150 A1* | 6/2008 | Kiwaki | ............... B60C 11/0302 152/209.25 |
| 2011/0108175 A1* | 5/2011 | Boiocchi | ............. B60C 11/0302 152/209.18 |
| 2014/0190606 A1* | 7/2014 | Takemoto | ........... B60C 11/1218 152/209.8 |

FOREIGN PATENT DOCUMENTS

| | | | |
|---|---|---|---|
| JP | 09-226323 A | * | 9/1997 |
| JP | 2004-155416 A | * | 6/2004 |
| JP | 2008-030605 A | * | 2/2008 |
| JP | 2010-70045 A | | 4/2010 |

OTHER PUBLICATIONS

Machine translation for German 10311430 (no date).*
Machine translation for Japan 09-226323 (no date).*
Machine translation for Japan 2008-030605 (no date).*
Extended European Search Report, dated Oct. 10, 2014, for European Application No. 14155003.8.

* cited by examiner

PNEUMATIC TIRE

BACKGROUND OF THE INVENTION

Field of the Invention

The present invention relates to a pneumatic tire that may exhibit better noise performance.

Description of the Related Art

A pneumatic tire that includes a tread portion with a pattern having a plurality of circumferentially and continuously extending main grooves and a plurality of lateral grooves is proposed. An irregular circumferential-pitch arrangement of lateral grooves is well known to improve noise performance of the tire by dispersing frequencies of respective pitch noises which occur when each lateral groove comes into contact with a road into a wide range. However, a pneumatic tire having better noise performance is requested these days.

SUMMARY OF THE INVENTION

The present invention has been worked out in light of the circumstances described above, and has a main object of providing a pneumatic tire having a tread pattern that may exhibit better noise performance.

According to one aspect of the present invention, a pneumatic tire includes a tread portion having an unsymmetrical tread pattern with a designated installing direction to a vehicle so as to have an inboard tread edge and an outboard tread edge. The tread pattern includes a first main groove that continuously extends in a circumferential direction of the tire at a nearest side of the inboard tread edge, a second main groove that continuously extends in the circumferential direction of the tire adjacent to the first main groove, and a middle land portion arranged between the first main groove and the second main groove. The middle land portion is provided with a plurality of inclined grooves each of which comprises its both ends terminating within the middle portion and has a groove depth in a range of not less than 3.0 mm, a plurality of inboard middle lateral grooves each of which comprises one end communicated with the first main groove and the other end communicated with the inclined groove, and a plurality of outboard middle lateral grooves each of which comprises one end communicated with the second main groove and the other end communicated with the inclined groove. Respective groove center points of the inboard middle lateral grooves are arranged in different places in the circumferential direction of the tire from respective groove center points of the outboard middle lateral grooves, wherein each groove center point is defined as a circumferential groove-width center point that locates at an axially center of each lateral groove.

In another aspect of the present invention, the tread pattern may further comprise an inner land portion arranged between the first main groove and the inboard tread edge, and an outer land portion arranged between the second main groove and the outboard tread edge. The inner land portion is provided with a plurality of inner shoulder lateral grooves each of which extends between the inboard tread edge and the first main groove. The outer land portion is provided with a plurality of outer shoulder lateral grooves each of which extends axially inwardly from the outboard tread edge. Respective groove center points of the inner shoulder lateral grooves, outer shoulder lateral grooves, outboard middle lateral grooves, and inboard middle lateral grooves may be arranged in different places in the circumferential direction of the tire.

In another aspect of the present invention, each inclined groove may have an angle in a range of from 10 to 30 degrees with respect to the circumferential direction of the tire.

In another aspect of the present invention, the tread pattern may further comprise a third main groove that continuously extends in the circumferential direction of the tire and is disposed between the outboard tread edge and the second main groove, and each outer shoulder lateral groove may terminate without communicating with the third main groove.

In another aspect of the present invention, each inclined groove may comprise a first end communicated with the inboard middle lateral groove, and a second end communicated with the outboard middle lateral groove.

In another aspect of the present invention, the circumferentially adjacent inclined grooves may be overlapped each other with respect to the circumferential direction of the tire each other.

DETAILED DESCRIPTION

An embodiment of the present invention will be explained below with reference to the accompanying drawings.

Figure 1:
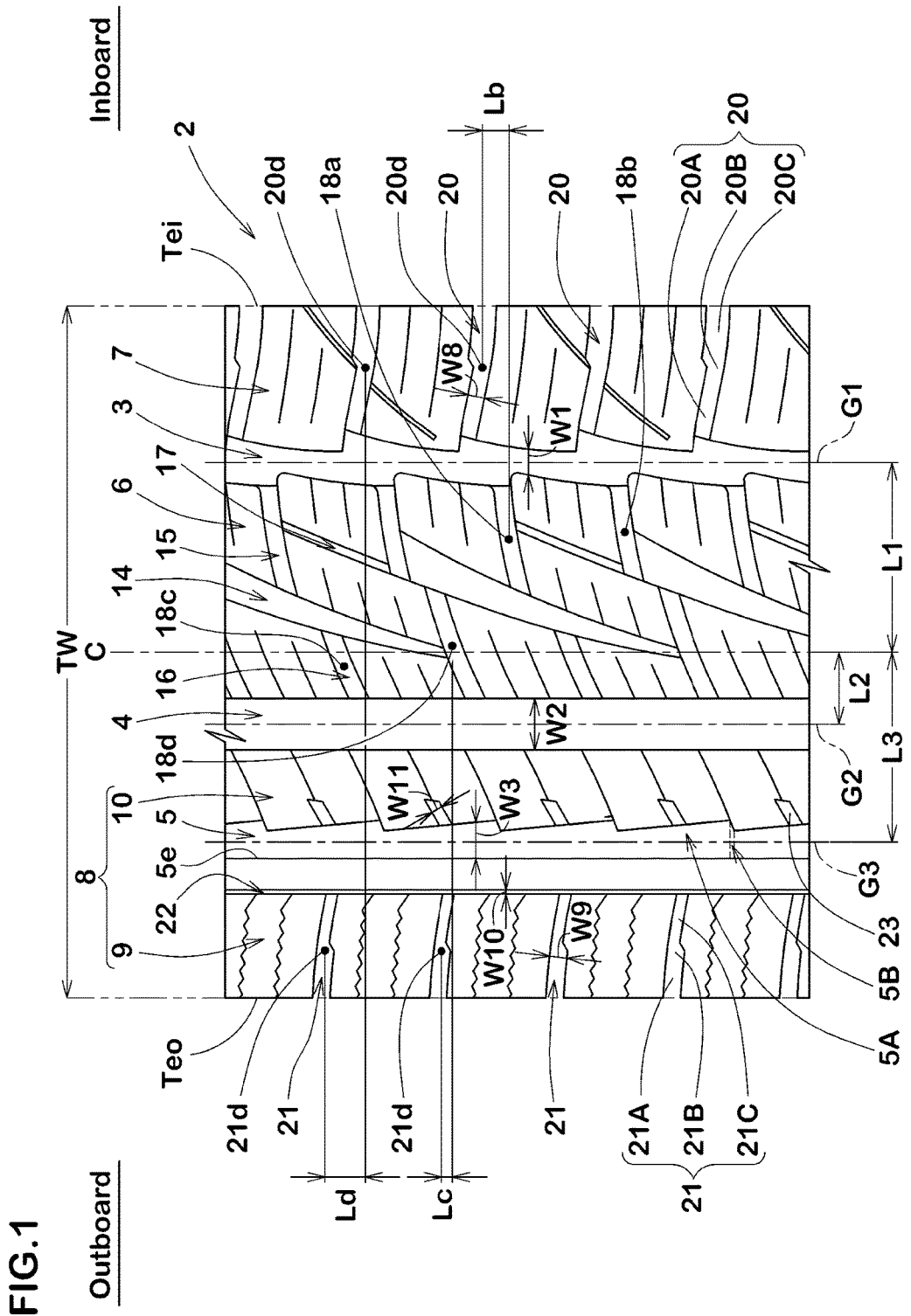
FIG. 1 is a development view illustrating a tread portion of a pneumatic tire in accordance with an embodiment of the present invention.

As shown in FIG. 1, a pneumatic tire in accordance with the present embodiment is suitably embodied as a passenger car tire. The tire includes a tread portion 2 having an unsymmetrical tread pattern with a designated installing direction to a vehicle so as to have an inboard tread edge Tei and an outboard tread edge Teo. The installing direction may be indicated on its sidewall portions (not shown) of the tire using characters or a mark, for example.

The tread pattern of the tread portion 2 includes a first main groove 3 that continuously extends in a circumferential direction of the tire at a nearest side of the inboard tread edge Tei, a second main groove 4 that continuously extends in the circumferential direction of the tire and is disposed adjacent to the first main groove 3, and a third main groove 5 that continuously extends in the circumferential direction of the tire and is disposed between the outboard tread edge Teo and the second main groove 4.

Thus, the tread portion 2 is divided into a plurality of land portions that include a middle land portion 6 arranged between the first main groove 3 and the second main groove 4, an inboard land portion 7 arranged between the first main groove 3 and the inboard tread edge Tei, and an outboard land portion 8 arranged between the second main groove 5 and the outboard tread edge Teo. In this embodiment, the outboard land portion 8 is further divided into a first outboard land portion 9 between the third main groove 5 and the outboard tread edge Teo and a second outboard land portion 10 between the second main groove 4 and the third main groove 5.

Here, the inboard tread edge Tei refers to one of the two tread edges, which is intended to be positioned towards the center of the vehicle body. The outboard tread edge Teo refers to the other tread edge which is intended to be positioned away from the center of the vehicle body. According thereto, in this application, the terms "outboard"

and "inboard" are used toward the outboard tread edge Teo and inboard tread edge Tei, respectively, to refer relative positions in the tire axial direction.

The terms "axially inner", "axially inward" and the like are used toward the tire equator C, and the terms "axially outer", "axially outward" and the like are used toward the tread edge in order to refer relative positions in the tire axial direction.

Each tread edge Tei and Teo is defined as an axially outer edge in a ground contact patch of the tread portion 2 under a standard loaded condition in which the tire is mounted on a standard wheel rim with a standard pressure and is loaded with a standard tire load at a camber angle of set to zero. The axial distance between the inboard tread edges Tei and the outboard tread edge Teo is defined as a tread width TW of the tire.

In this application including specification and claims, various dimensions, positions and the like of the tire refer to those under a standard unloaded condition of the tire unless otherwise noted. The standard unloaded condition is such that the tire 1 is mounted on the standard wheel rim with the standard pressure and is loaded with no tire load.

The standard wheel rim is a wheel rim officially approved or recommended for the tire by standards organizations, i.e. JATMA, TRA, ETRTO, and the like which are effective in the area where the tire is manufactured, sold or used. For example, the standard wheel rim is the "standard rim" specified in JATMA, the "Measuring Rim" in ETRTO, and the "Design Rim" in TRA or the like.

The standard pressure and the standard tire load are the maximum air pressure and the maximum tire load for the tire specified by the same organization in the Air-pressure/Maximum-load Table or similar list. The standard pressure is the "maximum air pressure" in JATMA, the "Inflation Pressure" in ETRTO, and the maximum pressure given in the "Tire Load Limits at Various Cold Inflation Pressures" table in TRA or the like. In case of passenger car tires, however, the standard pressure is uniformly defined by 180 kPa.

The standard tire load is the "maximum load capacity" in JATMA, the "Load Capacity" in ETRTO, and the maximum value given in the above-mentioned table in TRA or the like. In case of passenger car tires, however, the standard tire load is uniformly defined by 88% of the maximum tire load.

Figure 2:
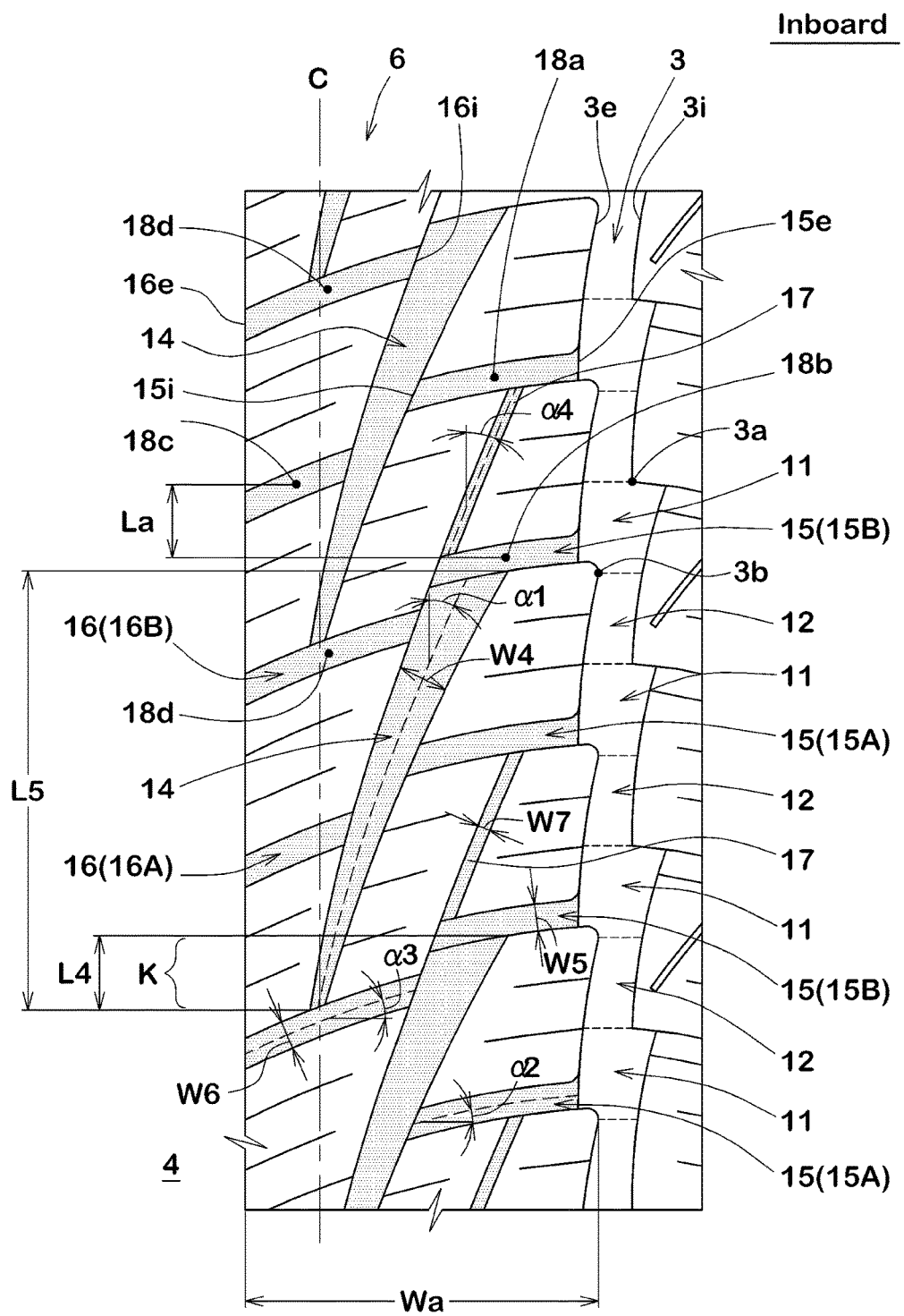
FIG. 2 is a partial enlarged view illustrating a middle land portion and a first main groove of FIG. 1.

FIG. 2 is a partial enlarged view illustrating the middle land portion 6 and the first main groove 3. As shown in FIG. 2, the first main groove 3 extends in a zigzag manner that alternately includes a wide portion 11 and a narrow portion 12. The wide portion 11 has its average groove width larger than that of the narrow portion 12. Referring to FIG. 2, the first main groove 3 includes an axially outer groove edge $3i$ having a plurality of axially innermost points $3a$ and an axially inner groove edge $3e$ having a plurality of axially outermost points $3b$. Each of the wide portion 11 and the narrow portion 12 is defined an area between an axial line passing through the axially inner point $3a$ of the outer groove edge $3i$ and an axial line passing through the axially outer point $3b$ of the inner groove edge $3e$, shown in a dotted line.

Referring back to FIG. 1, the second main groove 4 extends along in the circumferential direction of the tire in a straight manner to smoothly drain out the water backward of the tire.

In this embodiment, the third main groove 5 includes an axially outer groove edge $5e$ that extends along the circumferential direction of the tire in a straight manner, and an axially inner groove edge that extends in a zigzag manner. Accordingly, the third main groove 5 repeatedly includes a first portion 5A increasing its groove width toward the below of FIG. 1 and a second portion 5B decreasing its groove width toward the below of FIG. 1. The axially inner groove edge of the third main groove 5 may reduce a columnar resonance noise generated therein.

The first main groove 3, the second main groove 4 and the third main groove 5 preferably have respective groove widths W1, W2 and W3 in a range of not more than 9.5 mm, more preferably not more than 9.0 mm to provide better noise performance of the tire by reducing a columnar resonance noise generated therein. When the groove widths W1, W2 and W3 of the first main groove 3, the second main groove 4 and the third main groove 5 are excessively small, it might cause deterioration of drainage performance. Thus, the first main groove 3, the second main groove 4 and the third main groove 5 preferably have groove widths W1, W2 and W3 in a range of not less than 3.0 mm, more preferably not less than 3.5 mm, respectively.

In order to further improve the advantages above, each main groove 3, 4 and 5 preferably has a groove depth in a range of not less than 6.0 mm, more preferably not less than from 6.5 mm, but preferably not more than 10.0 mm, more preferably not more than 9.5 mm.

The location of each main groove 3, 4 and 5 is not particularly limited. For instance, an axial distance L1 between the groove centerline G1 of the first main groove 3 and the tire equator C may be set in a range of from 20.0% to 30.0% in relation to the tread width TW. An axial distance L2 between the groove centerline G2 of the second main groove 4 and the tire equator C may be set in a range of from 6.0% to 16.0% in relation to the tread width TW. An axial distance L3 between the groove centerline G3 of the third main groove 5 and the tire equator C may be set in a range of from 20.0% to 30.0% in relation to the tread width TW. When any one of the groove centerline extends in a zigzag manner with amplitude like the first main groove 3 and the third main groove 5, its distance from the tire equator C is measured using a centerline of the amplitude.

Referring back to FIG. 2, the middle land portion 6 is provided with a plurality of inclined main grooves 14, a plurality of inboard middle lateral grooves 15, and a plurality of outboard middle lateral grooves 16.

Each inclined groove 14 has both ends that terminate within the middle land portion 6. Specifically, the inclined groove 14 has a first end communicated with the inboard middle lateral groove 15, and a second end communicated with the outboard middle lateral groove 16. The inboard middle lateral groove 15 and the outboard middle lateral groove 16 are connected to the first main groove 3 and the second main groove 4, respectively. Thus, the air compressed between the inclined groove 15 and the road may be smoothly released through the lateral grooves 14 and 15, thereby reducing the sound level of air pumping noise caused by the inclined grooves 14.

The inclined groove 14 is inclined at angle $\alpha 1$ with respect to the circumferential direction of the tire so that its groove edges gradually come into contact with the road during traveling. Thus, a pitch noise caused by the inclined grooves 14 may be reduced. Preferably, the respective inclined grooves 14 may be formed in arc shapes.

To reduce traveling noise of the tire, the angle $\alpha 1$ of the inclined groove 14 is preferably set in a range of from 10 to 30 degrees, more preferably in a range of from 15 to 25 degrees with respect to the circumferential direction of the tire.

The inclined grooves 14 are spaced in the circumferential direction of the tire. To reduce the pitch noise by reducing the rigidity of the middle land portion 6, circumferentially adjacent inclined grooves 14 are preferably arranged so as to overlap each other with respect to the circumferential direction of the tire. To further reduce traveling noise of the tire, a circumferential length L4 of an overlapped portion K of the inclined grooves 14 is preferably set in a range of from 10% to 30% in relation to a circumferential length L5 of the inclined groove 14.

In this embodiment, the inclined groove 14 has a groove width that gradually increases toward the inboard tread edge Tei. To further improve noise performance of the tire, an average groove width W4 of the inclined groove 14 is preferably set in a range of from 11.0 to 12.0 mm. To further reduce the pitch noise, the inclined groove 14 preferably has a groove depth in a range of from 3.0 to 9.0 mm.

Each inboard middle lateral groove 15 has an axially outer end 15e coupled with the first main groove 3, and an axially inner end 15i coupled with the inclined groove 14.

In this embodiment, the inboard middle lateral grooves 15 include a first inboard middle lateral groove 15A and a second inboard middle lateral groove 15B.

The first inboard middle lateral groove 15A is coupled with a position other than both ends of the inclined groove 15. Preferably, the inner end 15i of the first inboard middle lateral groove 15A is coupled with a circumferential intermediate region of the inclined groove 15, and the outer end 15e of the first inboard middle lateral groove 15A is coupled with the wide portion 11 of the first main groove 3. Thus, the air pumped into the first main groove 3 from the first inboard middle lateral groove 15A may disturb the air flow in the first main groove 3 so that the sound level of the columnar resonance noise generated in the first main groove 3 is reduced.

Each second inboard middle lateral groove 15B is arranged between adjacent first inboard middle lateral grooves 15A. In this embodiment, each second inboard middle lateral groove 15B is coupled with the first end of the inclined groove 14, and terminates at the axially inner groove edge of the inclined groove 14. In this embodiment, the second inboard middle lateral groove 15B is coupled with the wide portion 11 of the first main groove 3.

Each outboard middle lateral groove 16 has one end 16e coupled with the second main groove 4, and the other end 16i coupled with the inclined groove 14. In this embodiment, the outboard middle lateral grooves 16 include a first outboard middle lateral groove 16A and a second outboard middle lateral groove 16B.

The first outboard middle lateral groove 16A is communicated with one inclined groove 14. The second outboard middle lateral groove 16B is communicated with two inclined grooves 14. In this embodiment, one terminating end of the inclined groove 14 is communicated with a laterally central region of the second outboard middle lateral groove 16B so as to form a T-shaped junction.

The respective groove center points 18a and 18b of the inboard middle lateral grooves 15 are arranged in different places in the circumferential direction of the tire from the respective groove center points 18c and 18d of the outboard middle lateral grooves 16, wherein each groove center point above is defined as a circumferential groove-width center point that locates at an axially center of each lateral groove. In this embodiment, the first inboard middle lateral grooves 15A, the second inboard middle lateral grooves 15B, the first outboard middle lateral grooves 16A, and the second outboard middle lateral grooves 16B have groove center points 18a, 18b, 18c, and 18d, respectively, which are arranged in different places in the circumferential direction of the tire. Namely, there is no case that two groove center points defined above are aligned on any tire axial line extending on the tread portion 2.

Thus, since the timing when the respective inboard and outboard middle lateral grooves 15 and 16 come into contact with the road during traveling are shifted from one another, the noise frequency produced by thereof may be distributed over a wide frequency band. Accordingly, the tire in accordance with the present embodiment exhibit better noise performance.

To further improve the advantage above, the circumferential smallest distance La between two groove center points of the inboard middle lateral groove 15 and the outboard middle lateral groove 16 is preferably set in a range of not less than 10 mm, more preferably not less than 12 mm.

To further improve the advantage above, the circumferential smallest distance La is preferably set in a range of from 0.30 to 0.35 times in relation to the axial maximum width Wa of the middle land portion 6.

The inboard middle lateral groove 15 and the outboard middle lateral groove 16 are inclined at angles $\alpha 2$ and $\alpha 3$ with respect to the axial direction of the tire, respectively. In this embodiment, the inboard middle lateral groove 15 and the outboard middle lateral groove 16 extend in arc fashions so that groove edges thereof gradually come into contact with the road along its longitudinal direction. Thus, tire noise may further be reduced.

To further improve the advantage above, the respective angles $\alpha 2$ and $\alpha 3$ of the inboard middle lateral groove 15 and the outboard middle lateral groove 16 are preferably set in a range of from 5 to 35 degrees. An angle of a tread groove including the middle lateral grooves 15 and 16 are measured using its groove centerline.

The first inboard middle lateral groove 15A and the second inboard middle lateral groove 15B are different in length with respect to the axial direction of the tire. The length of the first inboard middle lateral groove 15A is longer than that of the second inboard middle lateral groove 15B, for example. Similarly, the first outboard middle lateral groove 16A and the second inboard middle lateral groove 16B are different in length with respect to the axial direction of the tire. The length of the first outboard middle lateral groove 16A is shorter than that of the second outboard middle lateral groove 16B, for example. Accordingly, noise with different frequencies may be generated from the middle lateral grooves 15 and 16 with varied lengths when they come into contact with the road during traveling, thereby distributing frequency of tire noise over a wide frequency band.

For instance, the groove widths W5 of the inboard middle lateral grooves 15 and the groove widths W6 of the outboard middle lateral grooves 16 are preferably in a range of from 3.5 to 9.5 mm, more preferably 6.0 to 7.0 mm. When the groove widths W5 and W6 are set more than 9.5 mm, the rigidity of the middle land portion 6 tends to lower so that air pumping noise generated from the respective lateral grooves 15 and 16 may increase. When the groove widths W5 and W6 are set less than 3.5 mm, the rigidity of the middle land portion 6 tends to be high so that pitch noise generated from the respective lateral grooves 15 and 16 may increase. In this embodiment, these lateral grooves 15 and 16 have constant groove widths W5 and W6 in the longitudinal direction of the respective grooves. Similarly, groove depths of the inboard middle lateral grooves 15 and the outboard middle lateral grooves 16 are preferably in a range of from 3.0 to 6.5 mm.

The middle land portion 6 is further provided with a plurality of middle narrow grooves 17. Each middle narrow groove 17 includes one end communicated with the first inboard middle lateral groove 15A, and the other end communicated with the second inboard middle lateral grooves 15B. Accordingly, the air compressed by the first and second inboard middle lateral grooves 15 and 16 during traveling may be distributed to the middle narrow groove 17 so that tire noise performance improves.

To efficiently reduce air pumping noise generated from the middle narrow groove 17, it preferably has a groove depth in a range of less than 3.0 mm, but not less than 1.0 mm, and a groove width W7 in a range of from 2.5 to 3.5 mm.

To maintain the middle land portion 6 with well balanced rigidity, the middle narrow groove 17 is inclined at angle α4 in a range of from 10 to 30 degrees with respect to the circumferential direction of the tire.

In this embodiment, since the respective inclined grooves 14, inboard middle lateral grooves 15, outboard middle lateral grooves 16, and middle narrow grooves 17 have both-ends that are communicated with any other groove, air pumping noise generated from each groove on the middle land portion 6 may be reduced so that tire noise improves.

The inclined grooves 14, inboard middle lateral grooves 15, outboard middle lateral grooves 16, and middle narrow groove 17 are inclined in the same direction. In FIG. 2, the direction is illustrated as upward to the right. Accordingly, the middle land portion 6 is divided into a plurality of blocks having well balanced rigidity so that tire noise improves.

As shown in FIG. 1, the inboard land portion 7 is provided with a plurality of inboard shoulder lateral grooves 20 that communicate the first main groove 3 with the inboard tread edge Tei.

Each inboard shoulder lateral groove 20 includes a first portion 20A extending from the first main groove 3 toward the inboard tread edge Tei with a constant groove width, a third portion 20C extending from the inboard tread edge Tei toward the first main groove 3 with a groove width larger than that of the first portion 20A, and a second portion 20B extending between the first portion 20A and the third portion 20C while increasing its groove width to the third portion 20C.

For instance, the inboard shoulder lateral groove 20 preferably has an average groove width W8 in a range of from 6.0 to 7.0 mm, and a groove depth in a range of from 3.0 to 7.0 mm.

The first outboard land portion 9 is provided with a plurality of outboard shoulder lateral grooves 21, and a circumferentially extending outboard narrow groove 22.

Each outboard shoulder lateral groove 21 extends axially inward from the outboard tread edge Teo. In this embodiment, the axially inner end of the outboard shoulder lateral groove 21 terminates without communicating with the third main groove 5. Thus, the air compressed by the outboard shoulder lateral groove 21 is not directly distributed into the third main groove 5, thereby further improving noise performance.

In this embodiment, the respective groove center points 21d of the outboard shoulder lateral grooves 21 are positioned in different places in the circumferential direction of the tire in relation to the respective groove center points 18a to 18d of the outboard middle lateral grooves 16 and the inboard middle lateral grooves 15. Furthermore, the respective groove center points 20d of the inboard shoulder lateral grooves 20 are positioned in different places in the circumferential direction of the tire in relation to the respective groove center points 18a to 18d of the outboard middle lateral grooves 16 and the inboard middle lateral grooves 15. Furthermore, the respective groove center points 21d of the outboard shoulder lateral grooves 21 are positioned in different places in the circumferential direction of the tire in relation to the respective groove center points 20d of the inboard shoulder lateral grooves 20. Thus, since the timing when the respective outboard shoulder lateral grooves 21, inboard shoulder lateral groove 20, inboard middle lateral grooves 15, and outboard middle lateral grooves 16 come into contact with the road during traveling are shifted from one another, the noise frequency produced by thereof may be distributed over a wide frequency band. Accordingly, the tire in accordance with the present embodiment exhibit further excellent noise performance.

In order to further improve the advantage above, the circumferential smallest distance Lb between two groove center points among the inboard shoulder lateral groove 20, inboard middle lateral grooves 15, and outboard middle lateral grooves 16 is preferably set in a range of not less than 5 mm, more preferably not less than 7 mm. Similarly, the circumferential smallest distance Lc between two groove center points among the outboard shoulder lateral groove 21, inboard middle lateral grooves 15, and outboard middle lateral grooves 16 is preferably set in a range of not less than 5 mm, more preferably not less than 7 mm. Furthermore, the circumferential smallest distance Ld between the groove center point 20d of the inboard shoulder lateral groove 20 and the groove center point 21d of the outboard shoulder lateral groove 21 is preferably set in a range of not less than 7 mm, more preferably not less than 9 mm.

The outboard shoulder lateral groove 21 includes a first portion 21A extending from the outboard tread edge Teo toward axially inward with a constant groove width, a second portion 21B extending from the first portion 21A toward axially inward while decreasing its groove width, and a third portion 21C extending from the second portion 21B toward axially inward with a constant groove width smaller than that of the first portion 21A.

For instance, each outboard shoulder lateral groove 21 preferably has an average groove width W9 in a range of from 6.0 to 7.0 mm, and a groove depth in a range of from 3.0 to 7.0 mm.

The outboard narrow groove 22 continuously extends along the circumferential direction of the tire in a straight fashion. The respective axially inner ends of the outboard shoulder lateral grooves 21 are connected with the outboard narrow groove 22 and terminate thereto.

In order to reduce columnar resonance noise generated from the outboard narrow groove 22, the outboard narrow groove 22 preferably has a groove width W10 in a range of from 1.0 to 3.0 mm, and a groove depth in a range of from 0.5 to 2.0 mm.

The second outboard land portion 10 is provided with a plurality of middle lug grooves 23 that extend from the third main groove 5 toward axially to its axially inner ends terminating without reaching the second main groove 4.

While the particularly preferable embodiments of the present invention have been described in detail, the present invention in not limited to the illustrated embodiments, but can be modified and carried out in various aspects.

Comparison Test

Pneumatic tires having a size of 215/60R16 with a basic tread pattern shown in FIG. 1 and Table 1 were manufactured and tested. Details of test tires and the test method are as follows.

Details of Test Tires:
  Tread width TW: 166 mm
  First main groove depth: 7.9 mm
  Second main groove depth: 8.1 mm
  Third main groove depth: 7.9 mm
  Inboard middle lateral groove depth: 3.5 to 5.5 mm
  Outboard middle lateral groove depth: 3.5 to 5.5 mm
  Inclined groove depth: 5.5 to 7.9 mm
  Middle narrow groove depth: 2.5 mm
  Outboard shoulder lateral groove depth: 4.0 to 6.0 mm
  Outboard narrow groove depth: 1.0 mm
  Inboard shoulder lateral groove depth 4.0 to 6.0 mm Noise Performance and Steering Stability Test:

The test tires were installed to a passenger vehicle of 2,000 cc displacement, as its whole wheels under the following condition. Then, noise performance and steering stability on a dry asphalt road were evaluated by the driver's feeling. The test results were indicated using a score based on Ex. 1 being 100 in Table 1. The larger the score, the better the performance is.
  Rim: 16×6.5 JJ
  Internal pressure: 230 kPa

TABLE 1

|  | Ref. 1 | Ex. 1 | Ex. 2 | Ex. 3 | Ex. 4 | Ex. 5 | Ex. 6 |
|---|---|---|---|---|---|---|---|
| Distance La (mm) | 0 | 8 | 10 | 12 | 10 | 10 | 10 |
| Distance Lb (mm) | 5 | 5 | 5 | 5 | 0 | 3 | 7 |
| Distance Lc (mm) | 5 | 5 | 5 | 5 | 0 | 3 | 7 |
| Distance Ld (mm) | 7 | 7 | 7 | 7 | 7 | 7 | 7 |
| Inclined groove angle α1 (deg.) | 20 | 20 | 20 | 20 | 20 | 20 | 20 |
| Noise performance (Score) | 95 | 100 | 105 | 105 | 100 | 103 | 105 |
| Steering stability (Score) | 100 | 100 | 100 | 100 | 100 | 100 | 100 |

|  | Ex. 7 | Ex. 8 | Ex. 9 | Ex. 10 | Ex. 11 | Ex. 12 | Ex. 13 |
|---|---|---|---|---|---|---|---|
| Distance La (mm) | 10 | 10 | 10 | 10 | 10 | 10 | 10 |
| Distance Lb (mm) | 5 | 5 | 5 | 5 | 5 | 5 | 5 |
| Distance Lc (mm) | 5 | 5 | 5 | 5 | 5 | 5 | 5 |
| Distance Ld (mm) | 0 | 5 | 9 | 7 | 7 | 7 | 7 |
| Inclined groove angle α1 (deg.) | 20 | 20 | 20 | 5 | 10 | 30 | 35 |
| Noise performance (Score) | 100 | 103 | 105 | 102 | 104 | 104 | 102 |
| Steering stability (Score) | 100 | 100 | 100 | 98 | 99 | 101 | 102 |

La: Circumferential smallest distance between groove center points of inboard middle lateral groove and outboard middle lateral groove
Lb: Circumferential smallest distance between two groove center points among inboard shoulder lateral grooves, outboard middle lateral grooves, and inboard middle lateral grooves
Lc: Circumferential smallest distance between two groove center points among outboard shoulder lateral grooves, outboard middle lateral grooves, and inboard middle lateral grooves
Ld: Circumferential smallest distance between groove center points of outboard shoulder lateral groove and inboard shoulder lateral groove The test results show that the example tires in accordance with the present invention have excellent noise performance and steering stability in well balance as compared to the reference tires. Although the same tests were done using different tires in size and tires without sipes, the same results above were confirmed.

What is claimed is:

1. A pneumatic tire comprising:
   a tread portion having an unsymmetrical tread pattern with a designated installing direction to a vehicle so as to have an inboard tread edge and an outboard tread edge,
   the tread pattern comprising a first main groove that continuously extends in a circumferential direction of the tire at a nearest side of the inboard tread edge, a second main groove that continuously extends in the circumferential direction of the tire adjacent to the first main groove, and a middle land portion arranged between the first main groove and the second main groove,
   the middle land portion being provided with
      a plurality of inclined grooves each of which having both ends terminating within the middle portion and having a groove depth in a range of not less than 3.0 mm,
      a plurality of inboard middle lateral grooves each of which having one end that communicates with the first main groove and another end that communicates with the inclined groove,
      a plurality of outboard middle lateral grooves each of which having one end that communicates with the second main groove and another end that communicates with the inclined groove, and
      a plurality of middle narrow grooves each of which connects circumferentially adjacent inboard middle lateral grooves,
      wherein the outboard middle lateral grooves are inclined in a same direction as the inclined grooves, and
   respective groove center points of the inboard middle lateral grooves are arranged in different places in the circumferential direction of the tire from respective groove center points of the outboard middle lateral grooves, wherein each groove center point is defined as a circumferential groove-width center point that locates at an axially center of each lateral groove.

2. The tire according to claim 1,
   wherein the tread pattern further comprises an inner land portion arranged between the first main groove and the inboard tread edge, and an outer land portion arranged between the second main groove and the outboard tread edge,
   the inner land portion is provided with a plurality of inner shoulder lateral grooves each of which extends between the inboard tread edge and the first main groove, the outer land portion is provided with a plurality of outer shoulder lateral grooves each of which extends axially inwardly from the outboard tread edge, and respective groove center points of the inner shoulder lateral grooves, outer shoulder lateral grooves, outboard middle lateral grooves, and inboard middle lateral grooves are arranged in different places in the circumferential direction of the tire.

3. The tire according to claim 1, wherein each inclined groove has an angle in a range of from 10 to 30 degrees with respect to the circumferential direction of the tire.

4. The tire according to claim 2, wherein the tread pattern further comprises a third main groove that continuously extends in the circumferential direction of the tire and is disposed between the outboard tread edge and the second main groove, and each outer shoulder lateral groove terminates without communicating with the third main groove.

5. The tire according to claim 1, wherein each inclined groove comprises a first end communicated with the inboard middle lateral groove, and a second end communicated with the outboard middle lateral groove.

6. The tire according to claim 1, wherein the circumferentially adjacent inclined grooves are overlapped each other with respect to the circumferential direction of the tire each other.

7. The tire according to claim 1, wherein the middle narrow grooves have a groove depth in a range of less than 3.0 mm, but not less than 1.0 mm.

8. The tire according to claim 1, wherein the middle narrow grooves and the inclined main grooves are angled in the same direction.

9. The tire according to claim 1, wherein each of the middle narrow grooves comprises a groove edge aligned with a groove edge of each inclined main groove.

* * * * *